(12) United States Patent
Mayer

(10) Patent No.: US 7,203,990 B2
(45) Date of Patent: Apr. 17, 2007

(54) WIPER BLADE

(75) Inventor: Stephan Mayer, Karlsruhe (DE)

(73) Assignee: Robert Bosch GmbH (DE)

( * ) Notice: Subject to any disclaimer, the term of this patent is extended or adjusted under 35 U.S.C. 154(b) by 616 days.

(21) Appl. No.: 10/474,476

(22) PCT Filed: Oct. 14, 2002

(86) PCT No.: PCT/DE02/03874

§ 371 (c)(1),
(2), (4) Date: Oct. 9, 2003

(87) PCT Pub. No.: WO03/045746

PCT Pub. Date: Jun. 5, 2003

(65) Prior Publication Data

US 2004/0134011 A1 Jul. 15, 2004

(30) Foreign Application Priority Data

Nov. 21, 2001 (DE) ................. 101 57 130

(51) Int. Cl.
B60S 1/38 (2006.01)
B60S 1/40 (2006.01)

(52) U.S. Cl. .............. 15/250.32; 15/250.351; 15/250.43; 15/250.31

(58) Field of Classification Search .......... 15/250.31, 15/250.351, 250.352, 250.43, 250.44, 250.361, 15/250.32, 250.23, 250.452
See application file for complete search history.

(56) References Cited

U.S. PATENT DOCUMENTS 3,123,849 A * 3/1964 O'shei ............... 15/250.351
3,832,751 A * 9/1974 Ursel et al. .......... 15/250.23
6,415,473 B1 * 7/2002 Rapp ................. 15/250.351
6,820,302 B2 * 11/2004 Zimmer ............... 15/250.32

FOREIGN PATENT DOCUMENTS

| DE | 38 29 343 | | 3/1990 |
|---|---|---|---|
| DE | 196 05 428 | | 8/1997 |
| DE | 19605428 | * | 8/1997 |
| DE | 197 31 683 | | 1/1999 |
| DE | 101 03 889 | | 8/2002 |
| SU | 1572869 | | 6/1990 |

* cited by examiner

Primary Examiner—Gary K. Graham
(74) Attorney, Agent, or Firm—Michael Best & Friedrich LLP

(57) ABSTRACT

The invention starts with a wiper blade (20) comprised of a wiper strip support (22) and a wiper strip (24) that is guided laterally by a device (28) with a connecting rod (32, 74) vis-à-vis a wiper arm (10), whereby one end of the connecting rod (32, 74) is fixed so that it can pivot on an articulated part (12) of the wiper arm (10) approx. vertically to the windshield (26), and the connecting rod (32, 74) having lateral guide surfaces is adjacent to a part of the wiper blade (20). It is proposed that a pivot bearing (86, 88) be arranged on both ends of the connecting rod (32, 74), one of which permits a movement in the longitudinal direction of the wiper arm (10) or the wiper blade (20).

24 Claims, 3 Drawing Sheets

Figure 1:
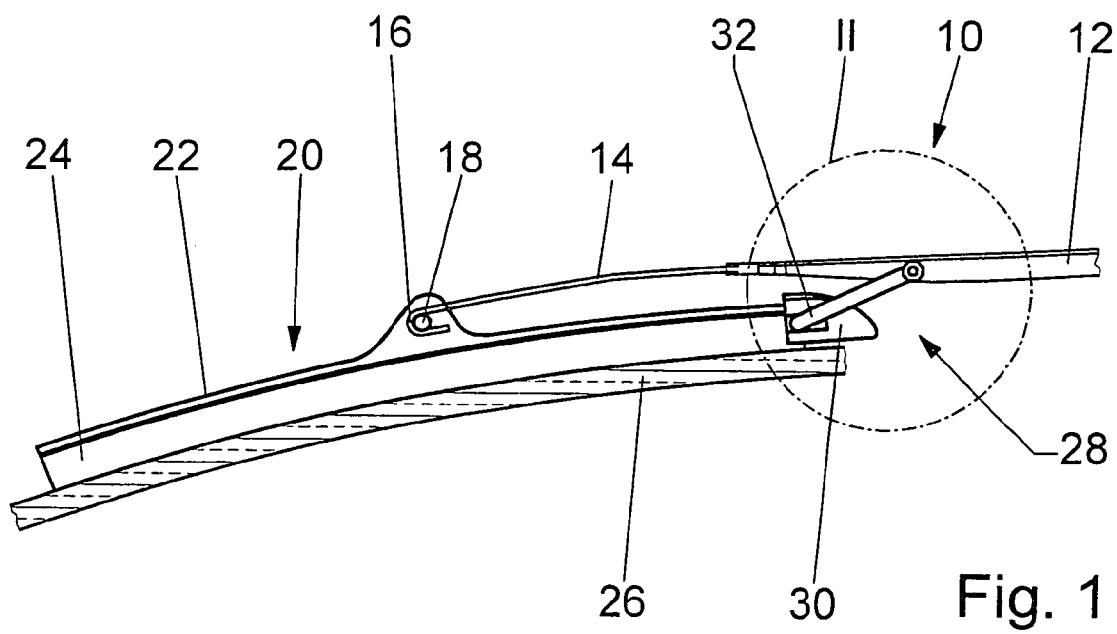

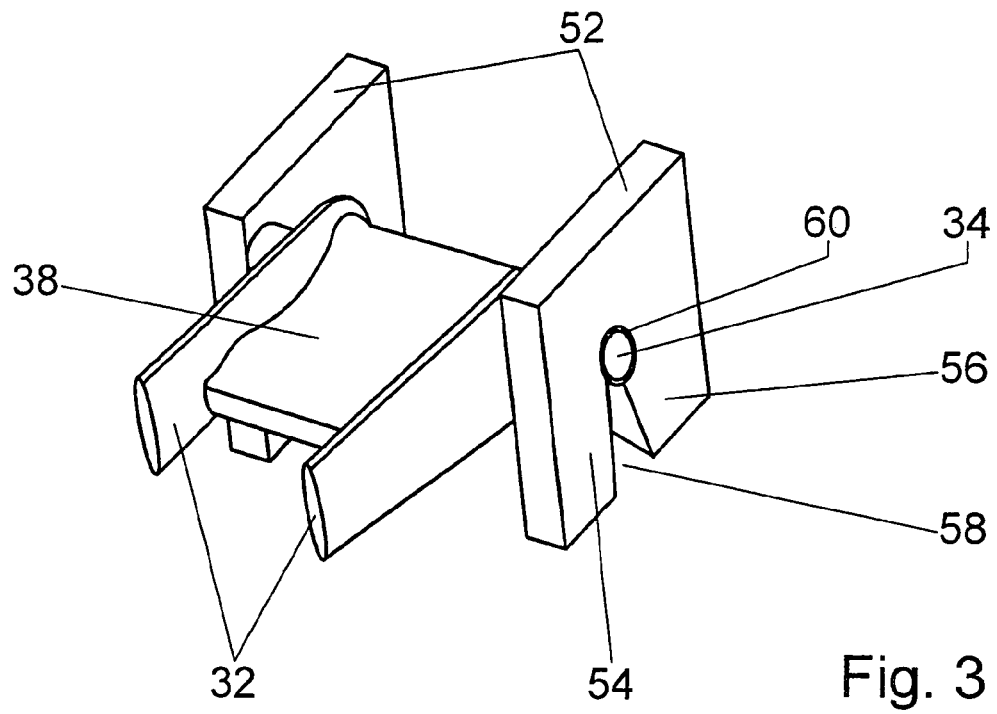
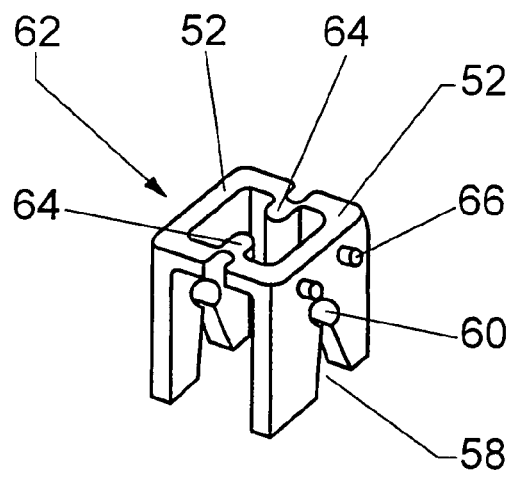
Fig. 4
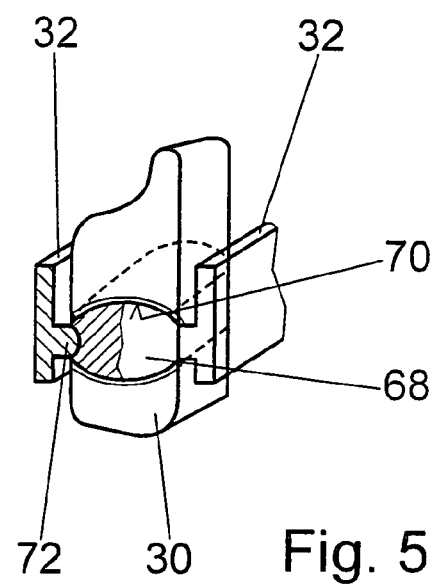
Fig. 5

WIPER BLADE

STATE OF THE ART

Known windshield wipers have a wiper arm constructed of a fastening part and an articulated part, which is connected to the fastening part in an articulated manner and has a wiper rod. This wiper rod can be formed as a special component that is permanently connected to the articulated part or directly connected at the articulated part. A wiper blade, which has a wiper strip support and a wiper strip, is connected in an articulated manner with the wiper rod. Normally, the wiper strip support is comprised of a supporting bracket system with a center bracket and, if need be, subordinate brackets, e.g., an intermediate bracket and/or claw brackets, which hold a wiper strip. These types of windshield wipers are known from DE 37 44 237 A1, for example.

In addition, an inarticulate supporting element made of an elastic high-strength plastic is known from DE 197 38 232 A1, which holds the wiper strip and has a curvature in an unloaded state that is designed so that uniform application force is produced when the wiper strip is applied completely to the vehicle window during operation of the wiper blade. Caps made of plastic are mounted on the front sides as a termination to the profile. Similar wiper blades with a supporting element made of spring steel are also known. Both a supporting bracket system as well as a supporting element in the sense described above shall be understood in the following as a wiper strip support.

The wiper blade is incited to vibrate since a wiper blade is a slim component and because of great speed differences between the drive-side inner area and the outer area of the wiper blade that produce different friction conditions as well as due to the stick-slip effects at low speeds and great friction. This leads, particularly on the inner circle of the wiper blade where especially low friction speeds are predominant, to undesired lateral movements, which starting at a certain size can lead to the wiper blade impacting the wiper arm and causing clattering noises. This is particularly critical if the vehicle windows are dry, dirty, icy, or not moist enough or there is snow on the vehicle window. As a result of the chattering, the wiper blade loses contact with the vehicle window in the short term, whereby in addition moisture and dirt are flung onto the windshield making the wiped image unsatisfactory. The more bracket parts the wiper blade has, the sooner it tends to rattle. In addition, light wiper blades with low spring rigidity are less favorable than others. Above all with relatively long wiper blades, particularly those with lengths greater than 550 mm, the guidance at the joint between the wiper blade and the wiper arm is not sufficiently stable to prevent these vibrations.

In addition, a device to guide the wiper blade, which has a first and a second part, is known from DE 197 31 683 A1. It is arranged in the area of the coupling location of a claw bracket, namely the claw bracket that is close to the inner circle of the wiper blade, and permanently connected to the articulated part of the wiper arm, e.g., via adhesion, welding, soldering, clipping, clamping, etc. The first part of the device has guide cheeks, which grip around the articulated location of the claw bracket and guide with respect to the wiper arm. The second part also has guide cheeks, between which the first part is guided in a telescoping manner so that its guide cheeks can be held briefly and a collision with the vehicle window need not be feared even when the vehicle window has strong curvatures. The first part is appropriately connected with the device so that it is secure from loss, for example, via a flexible element.

The second part can also be composed of a spring tongue, which connects the first part to the device so that the first part is rigidly guided in the movement direction of the windshield wiper while it can give way vis-à-vis the wiper arm perpendicular to the vehicle window. Naturally, it is also possible to select a combination of a spring tongue and guide cheeks as a second part, whereby the spring tongue can assume the function of the flexible element. In addition, the device can be manufactured and composed of individual sheet metal parts, but it is preferably a plastic injection molded part made of a suitable plastic. In any case, additional components are required to guide the wiper blade, whereby increased expenditures for fabrication and assembly, and additional material costs are incurred. Air gaps between the guide surfaces of the device are required in order to prevent the joint between the wiper blade and the wiper arm from jamming due to wiper-arm geometry that is influenced by tolerances such as right angles on the wiper rod. Clattering noise can also occur in this case, because, though the lateral vibrations are diminished, the lateral change in application is not avoided in the wiper process. In addition, threading the wiper blade into the guide of the device is expensive if the wiper blade is guided back from a swung-down position into the parked position on the windshield. In this case, a malfunction or a breakdown cannot be excluded.

ADVANTAGES OF THE INVENTION

According to the invention, a pivot bearing is arranged on both ends of the connecting rod, one of which permits a movement in the longitudinal direction of the wiper arm or the wiper blade. The pivot bearings on the ends of the connecting rod control the relative stroke movement of the wiper blade to the wiper arm so that despite great stroke movements there is never a danger of parts of device coming into contact with the windshield. As a result, the device is particularly suited for flat-designed connecting arms, in which it can be inserted in a concealed manner into the profile of the wiper arm. Since the device at the end of the wiper blade engages on the wiper blade strip near the windshield, the tendency to bend the guide is low.

In order to permit a movement of one of the pivot bearings in the longitudinal direction of the wiper arm or the wiper blade, a pivot bearing has a longitudinal guide in the cited direction, which is not normally used for lateral guidance of the wiper blade, but only to control the stroke movement. In addition, it prevents the parts of the device from becoming disengaged when the wiper arm is in the swung-down position and from having to be rethreaded when being moved back. Used for lateral guidance of the wiper blade are guide surfaces on the connecting rods, which cooperate with corresponding guide surfaces on a clip, which sits on the wiper blade. The clip is embodied suitably as an end cap and is a plastic injected molded part. It is placed on the wiper strip or on an inarticulate wiper strip support on the end or in an area between this and a coupling point of the wiper blade on the wiper arm. The guide surfaces are arranged between the pivot bearing in order to achieve a compact construction.

In accordance with one exemplary embodiment of the invention, at least one catch pin that is permanently connected to the connecting rod forms the pivot bearing on the side of the wiper blade. It is positioned in the clip of the wiper blade in a catch groove, which runs in the longitudinal direction of the wiper blade. The catch pin has enough movement free play in the catch groove that the bearing forces of the wiper blade are not affected by the pivot bearing. The catch pin is held in the catch groove by means of a locking hook, which yields elastically when threading the catch pin into the catch groove and ultimately locks the open end of the catch groove.

Since only one pivot bearing needs to have a longitudinal guide, the pivot bearing on the side of the wiper arm is suitably formed by a rotational axis, which is positioned in rest bore holes or indentations in the articulated part or in an adapter that is connected to it and guided by lateral stopping faces. The rotational axis or the adapter is inserted in the inner area of the profile of the articulated part or wiper rod, which profile is normally U-shaped and opened towards the windshield. In doing so, the elasticity of the side cheeks of the profile must be coordinated with the elasticity of the swivel axis in such a way that it locks into the indentations or into the rest bore holes of the articulated part.

The rotational axis can also be positioned directly above an adapter in the articulated part or in the wiper rod formed on it. The adapter is made up essentially of two adapter pieces, which are fastened in an opposing manner and concealed in the U-shaped profile of the articulated part, and each features a rest bore hole for the swivel axis, which is open via a key slot towards the windshield so that the swivel axis can be locked into the rest bore hole through the key slot. Depending upon embodiment and material, the adapter pieces can be guided, welded or soldered to the articulated part. According to one embodiment, the opposing adapter pieces are connected to one another by spring elements and feature pins on their outer sides, which lock into corresponding recesses or indentations of the articulated part. As a result, the device to guide the wiper blade can be mounted easily and safely without great expense.

The device can have two parallel connecting rods, which feature guide surfaces on their facing sides, which guide surfaces are adjacent to the lateral guide surfaces of the clip. The catch pin, which forms the pivot bearing on the side of the clip, is connected with the connecting rods. It can be divided in the middle or also be formed continuously to support the connecting rod. In addition, the device can be reinforced with a connecting piece in the area of the other pivot bearing. As a result, the lateral resilience of the connecting rods can be modified in the wiping direction in order to coordinate the lateral guidance of the wiper blade with the manufacturing tolerances that must be complied with.

In accordance with an embodiment of the invention, the device has only one connecting rod to guide the wiper blade, which connecting rod is positioned in the pivot bearings and guided into a longitudinal guide slot between two side cheeks of the clip. The connecting rod can be arranged centrically to the clip or laterally offset in order to facilitate a lateral offset of the wiper blade vis-à-vis the wiper arm. This purpose can also be achieved or supported in many cases by bending the connecting rod at a right angle.

In a simple design, the cross-section of the connecting rod has an annular cross-section. As a result, it is light and has the same momentum of resistance against bending in all directions. The use of a cross-section that deviates from the circular shape permits the momentum of resistance to be formed differently in different directions and adapted to the conditions of use. Oval or polygonal cross-sections are suitable in this case. They also produce favorable guide surfaces. They can also be modified by flattening in the area of the guide surfaces.

The free play between the guide surfaces on the connecting rod and the guide surfaces on the clip can be selected to be very small since it is selected independently from the bearing plays of the pivot bearing. However, in order to achieve guidance that is free of play and that prevents any noise from developing, at least one of the guide surfaces has spring elements with which they are adjacent to the corresponding guide surfaces.

The device to guide the wiper blade in accordance with the invention exerts no forces and moments on the wiper blade in the direction of the windshield so that it does not influence the bearing force of the wiper strip. So that the wiper strip can also rotate around its longitudinal axis, it is advisable that the catch pin be executed to be crowned in the longitudinal direction and run in a corresponding guide groove of the clip. In doing so, the catch pin can be embodied in an advantageous manner as a crowned roll, which is positioned on bearing pins on the connecting rods. The free play between the crowned catch pin and the corresponding guide groove is selected in such a way that thereby the lateral guide forces can be transmitted simultaneously from the connecting rods to the clip.

DRAWINGS

Additional advantages are yielded from the following description of the drawings. Exemplary embodiments of the invention are depicted in the drawings. The drawings, the description and the claims contain numerous features in combination. The expert will also observe the individual features expediently and combine them into additional, meaningful combinations.

The drawings show:

FIG. 1 A schematic side view of a wiper arm with a wiper blade that is connected in an articulated manner.

Figure 2:
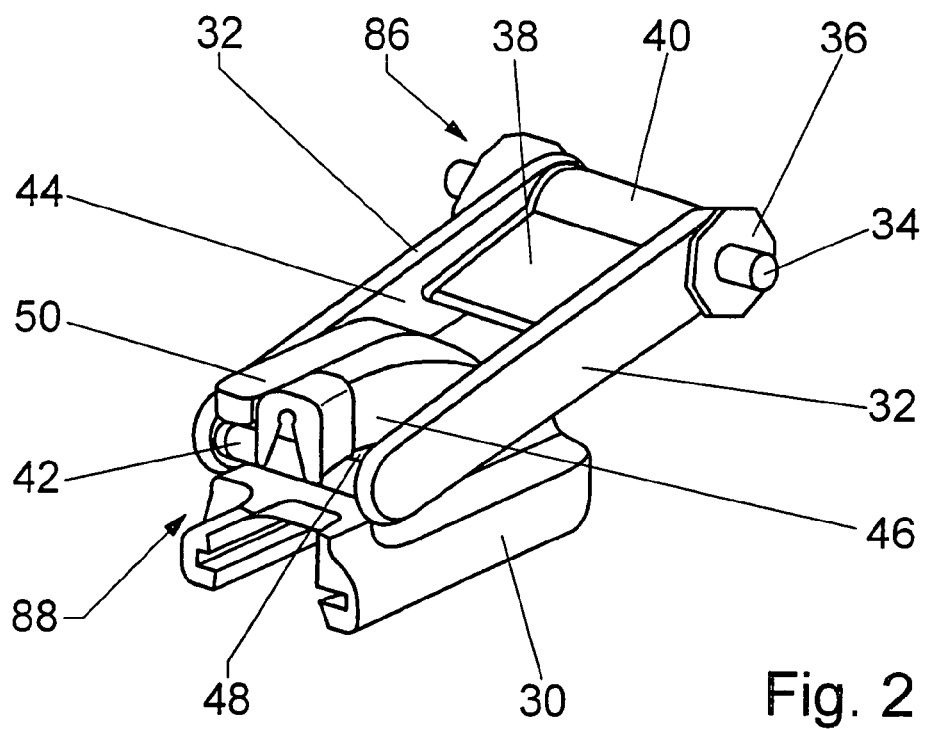

FIG. 2 A perspective representation of a detail of a device with two connecting rods corresponding to Line II in FIG. 1.

FIG. 3 The fastening of a device according to FIG. 2 by means of an adapter.

FIG. 4 A perspective representation from below of a variation of the adapter according to FIG. 3 of an articulated part with a wiper blade.

FIG. 5 A crowned catch pin as a variation of FIG. 2.

Figure 6:
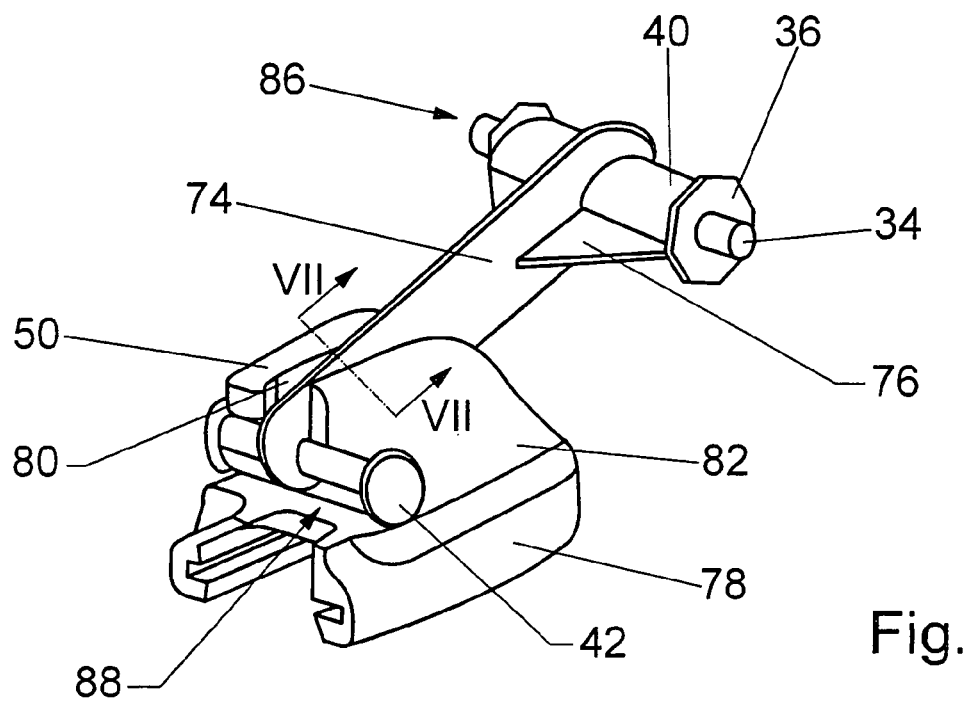

FIG. 6 A variation with a connecting rod according to FIG. 2.

Figure 7:
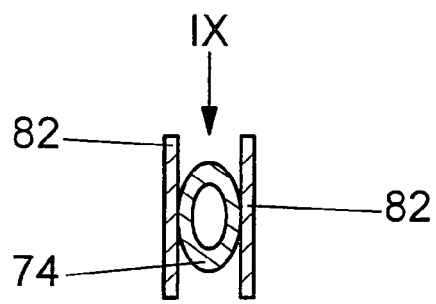

FIG. 7 A schematic cross-section corresponding to Line VII—VII in FIG. 6.

Figure 8:
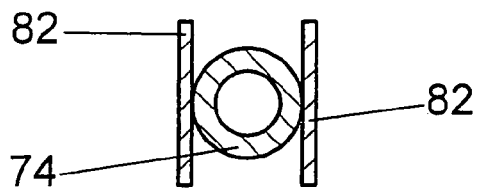

FIG. 8 A variation of FIG. 7.

Figure 9:
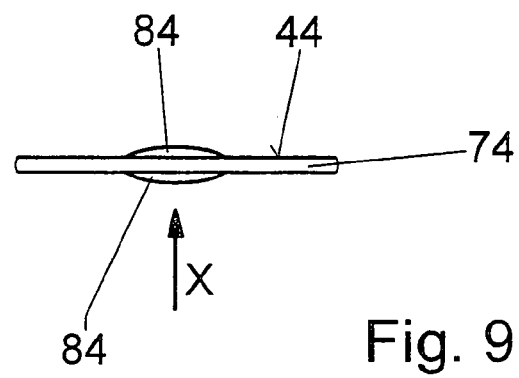

FIG. 9 A partial view of a connecting rod with spring elements corresponding to Arrow IX in FIG. 7.

Figure 10:
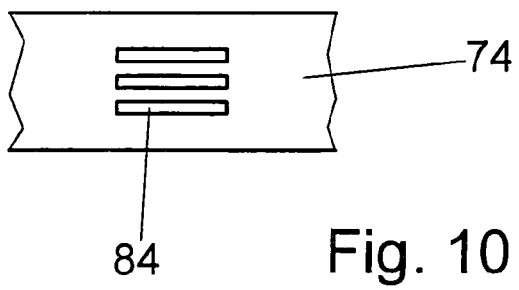

FIG. 10 A side view of the connecting rod corresponding to Arrow X in FIG. 9.

DESCRIPTION OF THE EXEMPLARY EMBODIMENTS

FIG. 1 depicts a wiper arm's 10 articulated part 12 and a wiper rod 14 whose hook-shaped end 16 grips around an articulated bolt 18 of a wiper blade 20, thereby connecting the wiper blade 20 in an articulated manner with the wiper arm 10. The wiper blade 20 has a wiper strip support 22 with a wiper strip 24. This is positioned adjacent to a windshield 26.

Provided between the wiper blade 20 and the articulated part 12 of the wiper arm 10 is a device 28 to laterally guide the wiper blade 20 with two parallel connecting rods 32

(FIG. 2). The connecting rods 32 are pivoted at their ends in pivot bearings 86 and 88. The pivot bearing 86 on the side of the wiper arm 10 has a rotational axis 34, which can be permanently connected with the connecting rods 32 and can be composed of two lateral pins. The rotational axis 34 can also run through a hub piece 40 of the device 28 as a single part. It is either permanently connected to the connecting rods 32 and the hub piece 40 and pivoted in the wiper arm 10 or permanently connected to the wiper arm 10. In this case, the connecting rods 32 are pivoted with the hub piece 40 on the rotational axis 34.

The rotational axis 34 is inserted into a U-shaped profile of the wiper arm 10 that is open toward the windshield 26, into which it locks in corresponding indentations or recesses of the U-shaped profile of the wiper arm 10 or an adapter 62 that is connected with the wiper arm 10. Lateral stopping faces 36 are provided in the area of the rotational axis 34 for lateral guidance of the device 28 in the wiper arm 10. The lateral stopping faces cooperate with corresponding stopping faces (not shown) on the wiper arm 10. A connecting piece 38 is attached to the hub piece 40 in the longitudinal direction of the connecting rods 32. The connecting piece can be embodied to be more or less long and mutually support the connecting rods 32. As a result, the lateral resilience of the device can be modified.

The pivot bearing 88 on the other end of the connecting rods 32 is formed by a catch pin 42, which connects the two connecting rods 32 to one another or which can be divided in the middle. The catch pin 42 is guided into a catch groove 48 of a clip 30, which is formed as an end cap. The end cap 30 is placed on the end of the wiper strip 24 or wiper strip support 22 facing the wiper arm 10, whereby the catch groove 48 runs in the longitudinal direction of the wiper strip 24. The connecting rods 32 are pivoted in the catch groove 48 via the catch pin 42, in addition, the catch pin 42 can also move freely within the catch groove 48 in the longitudinal direction of the wiper strip 24 so that longitudinal compensation takes place with a swiveling movement of the connecting rods 32 around the rotational axis 34. A locking hook 50 is provided so that the catch pin 42 does not unintentionally slide out of the catch groove 48 when the wiper arm 10 is in a swung-down position. The locking hook yields elastically when mounting the device 28 and then blocks the open side of the catch groove 48 so that the catch pin 42 is locked in the catch groove 48. Thus, operating errors and malfunctions are excluded after proper initial mounting.

For simplified assembly it can be expedient to position the rotational axis 34 in an adapter 62, which is composed of two adapter pieces 52 in a simple design (FIG. 3). These are attached to the inner side walls of the U-shaped profile of the wiper arm 10 and have a rest bore hole 60, which is open via a key slot 58 towards the windshield 26 or in the longitudinal direction of the wiper arm 10. The rotational axis 34 is locked into the rest bore hole 60 via the key slot 58, whereby the legs 54 and 56 of the adapter piece 52 located at the two sides of the key slot 58 yield elastically.

In the adapter 62 design in accordance with FIG. 4, the adapter pieces 52 are connected to one another via spring elements 64, which have an effect transverse to the side walls of the U-shaped profile of the wiper arm 10. Provided on the outer sides of the adapter pieces 52 are pins 66, which lock into the corresponding recesses or indentations of the wiper arm 10 during assembly because the spring elements 64 yield.

In order to permit a greater pivot movement of the wiper blade 20 around its longitudinal axis, it is expedient to execute the catch pins 68 to be crowned in the direction of their rotational axis and to position them in a corresponding guide groove 70. As a result, the end cap 30 and thus the wiper blade 20 can pivot around its longitudinal axis. The catch pin 68 can also be executed as a crowned roll, which is positioned on bearing pins 72 on the connecting rods 32 (FIG. 5).

The variation according to FIG. 6 shows a device 28 with a single connecting rod 74, which is connected to the hub piece 40 by means of a supporting angle 76. On its other end, it is guided into a guide slot 80 between two side cheeks 82 of the clip, which is embodied as an end cap 78. The guide slot 80 (FIG. 6) as well as the guide surfaces 44, 46 (FIG. 2) are arranged between the pivot bearings 86 and 88 so that no parts of the device 28 come into contact with the windshield 26 in the case of a relative movement between the wiper blade 20 and the wiper arm 10.

The cross-sectional contour of the connecting rods 32, 74 is annular in the case of the design according to FIG. 8. In this case, the momentum of resistance against bending is the same in all directions. In order to better adapt the momentum of resistance to the respective installation conditions, it can be expedient for the cross-sectional contours of the connecting rods 32, 74 to have a cross-sectional contour that deviates from a circular shape, e.g., oval or polygonal, in accordance with an embodiment as per FIG. 7. As a result, properties of the guide surfaces 44 and the contact surfaces in the guide slot 80 can also be modified.

The free play between the guide surfaces 44 on the connecting rods 32 and the guide surfaces 46 on the end cap 30 as well as between the connecting rod 74 and the side cheeks of the guide slot 80 (FIG. 6) can be selected to be very narrow without impairing the function of the device 28. In order to realize guidance that is free of play, it is expedient to provide spring elements 84, which support themselves on the corresponding surfaces, on one of the surfaces 44, 46, 80 or on the side surfaces of the connecting rod 74. The spring elements 84 guarantee that no play arises even in the case of wear to the guide surfaces 44, 46, 80.

The invention claimed is:

1. Wiper blade (20) comprised of a wiper strip support (22) and a wiper strip (24) that is guided laterally with respect to a wiper arm (10) by a device (28) with a connecting rod (32, 74), whereby one end of the connecting rod (32, 74) can be fixed so that it can pivot on an articulated part (12) of the wiper arm (10) approximately vertically to a windshield (26), and the connecting rod (32, 74) having lateral guide surfaces adjacent a clip that sits on the wiper blade (20), characterized in that a pivot bearing (86, 88) is arranged on both ends of the connecting rod (32, 74), one of which permits longitudinal movement of either the wiper arm (10) or the wiper blade (20), and characterized in that at least one catch pin (42) that is permanently connected to the connecting rod (32, 74) forms the pivot bearing (88) on the side of the wiper blade (20), whereby the catch pin (42) is received in the clip (30, 78) that sits on the wiper blade (20) and is positioned in a catch groove (48) that runs in the longitudinal direction of the wiper blade (20).

2. Wiper blade according to claim 1, characterized in that the clip (30, 78) is embodied as an end cap.

3. Wiper blade according to claim 1, characterized in that an elastic locking hook (50) holds the catch pin (42) in the catch groove (48) that is open towards an articulated bolt (18).

4. Wiper blade according to claim 1, characterized in that the pivot bearing (86) on the side of the wiper arm (10) is formed by a rotational axis (34), which is positioned in rest bore holes or indentations of the articulated part (12) or in an adapter (52, 62) that is connected to it and guided by lateral stopping faces (36).

5. Wiper blade according to claim 4, characterized in that the adapter (62) is made up of two opposing adapter pieces (52), which are fastened to inner surfaces of side cheeks of the articulated part (12) and each feature a key slot (58) that is open towards the windshield (26) and that has a rest bore hole (60) arranged on an end, into which the rotational axis (34) is clipped.

6. Wiper blade according to claim 5, characterized in that the adapter pieces (52) are connected by spring elements (64) and feature pins (66) on their outer sides, which lock into corresponding recesses or indentations of the articulated part.

7. Wiper blade according to claim 1, characterized in that the pivot bearing (86) on the side of the wiper arm (10) is formed by a rotational axis (34) that is permanently connected with the wiper arm (10), on which a hub piece (40) is pivoted, which is permanently connected with the connecting rod (32, 74) and guided by lateral stopping faces (36).

8. Wiper blade according to claim 1, characterized in that guide surfaces (44, 46) on the connecting rod (32, 74) or on the clip (30, 78) are arranged between the pivot bearings (86, 88).

9. Wiper blade according to claim 1, characterized in that two parallel connecting rods (32) are provided, which feature guide surfaces (44) on their facing sides, which guide surfaces are adjacent to lateral guide surfaces (46) of the clip (30).

10. Wiper blade according to claim 1, characterized in that the connecting rod (32) is guided into a guide slot (80) of the clip (78).

11. Wiper blade according to claim 1, characterized in that two connecting rod are provided, wherein the connecting rods (32, 74) are mutually supported at a hub piece (40) or a rotational axis (34) via a connecting piece (38).

12. Wiper blade according to claim 1, characterized in that the connecting rod (32, 74) has an annular cross-sectional profile.

13. Wiper blade according to claim 1, characterized in that the connecting rod (32, 74) features a cross-sectional contour deviating from a circular shape.

14. Wiper blade according to claim 1, characterized in that the catch pin (68) is crowned along its length and runs in a corresponding guide groove (70) of the clip (30).

15. Wiper blade according to claim 14, characterized in that the catch pin (68) is positioned on bearing pins (72) on the connecting rods (32).

16. Wiper blade according to claim 1, characterized in that the connecting rod (74) is supported at a hub piece (40) or a rotational axis (34) via a supporting angle (76).

17. Wiper blade (20) comprised of a wiper strip support (22) and a wiper strip (24) that is guided laterally with respect to a wiper arm (10) by a device (28) with a connecting rod (32, 74), whereby one end of the connecting rod (32, 74) can be fixed so that it can pivot on an articulated part (12) of the wiper arm (10) approximately vertically to a windshield (26), and the connecting rod (32, 74) having lateral guide surfaces adjacent guide surfaces on a clip that sits on the wiper blade (20), characterized in that a pivot bearing (86, 88) is arranged on both ends of the connecting rod (32, 74), one of which permits longitudinal movement of either the wiper arm (10) or the wiper blade (20), and, characterized in that the guide surfaces (44) on the connecting rod (32, 74) or the guide surfaces (46, 80) on the clip (30, 78) feature spring elements, with which they are adjacent to the respective other guide surfaces (44, 46, 80).

18. Wiper blade according to claim 17, characterized in that the pivot bearing (86) on the side of the wiper arm (10) is formed by a rotational axis (34), which is positioned in rest bore holes or indentations of the articulated part (12) or in an adapter (52, 62) that is connected to it and guided by lateral stopping faces (36).

19. Wiper blade according to claim 18, characterized in that the adapter (62) is made up of two opposing adapter pieces (52), which are fastened to inner surfaces of side cheeks of the articulated part (12) and each feature a key slot (58) that is open towards the windshield (26) and that has a rest bore hole (60) arranged on an end, into which the rotational axis (34) is clipped.

20. Wiper blade according to claim 19, characterized in that the adapter pieces (52) are connected by spring elements (64) and feature pins (66) on their outer sides, which lock into corresponding recesses or indentations of the articulated part.

21. Wiper blade according to claim 17, characterized in that the pivot bearing (86) on the side of the wiper arm (10) is formed by a rotational axis (34) that is permanently connected with the wiper arm (10), on which a hub piece (40) is pivoted, which is permanently connected with the connecting rod (32, 74) and guided by lateral stopping faces (36).

22. Wiper blade according to claim 17, characterized in that the guide surfaces (44, 46) on the connecting rod (32, 74) or on the clip (30, 78) are arranged between the pivot bearings (86, 88).

23. Wiper blade according to claim 17, characterized in that the connecting rod (32, 74) has an annular cross-sectional profile.

24. Wiper blade according to claim 17, characterized in that the connecting rod (32, 74) features a cross-sectional contour deviating from a circular shape.

* * * * *